United States Patent [19]

Welty

[11] 4,223,480
[45] Sep. 23, 1980

[54] POTTED PLANT TRANSPLANT LINER

[76] Inventor: Gary A. Welty, 10144 Del Rio Rd., Spring Valley, Calif. 92078

[21] Appl. No.: 956,617

[22] Filed: Nov. 1, 1978

[51] Int. Cl.³ .............................................. A01G 9/02
[52] U.S. Cl. .......................................... 47/73; 47/66; 47/75; 47/78
[58] Field of Search ........................ 47/66, 73, 75–76, 47/78–79

[56] References Cited

U.S. PATENT DOCUMENTS

| Re. 16,690 | 7/1927 | Everett | 47/73 |
| 437,565 | 9/1890 | Byrne | 47/73 |
| 681,066 | 8/1901 | Millingar | 47/73 X |
| 923,663 | 6/1909 | Kroeger | 47/66 |
| 1,031,713 | 7/1912 | Hills | 47/73 |
| 1,638,693 | 8/1927 | Hooks | 47/73 |
| 1,707,551 | 4/1929 | Hale | 47/79 |
| 2,140,932 | 12/1938 | Avery | 47/66 |
| 3,195,272 | 7/1965 | Mosher et al. | 47/73 |
| 4,059,921 | 11/1977 | Moriwaki | 47/73 |

FOREIGN PATENT DOCUMENTS 1186730  4/1970  United Kingdom ..................... 47/78

Primary Examiner—Robert E. Bagwill

[57] ABSTRACT

A liner for plant pots covers substantially the entire interior surface of the pot and has upwardly extending finger grips which project through the top of the soil, permitting the liner to be gripped and drawn upwardly, raising the root and soil mass of a plant free of the surrounding pot, the flexible sheet member which comprises the liner being made in two or more distinct segments joined at the bottom such that they can easily be parted from the soil mass permitting the repotting of the mass, ordinarily into a larger pot or container.

4 Claims, 7 Drawing Figures

POTTED PLANT TRANSPLANT LINER

BACKGROUND OF THE INVENTION

The invention is in the field of house plants, and particularly relates to means of easily removing a potted plant from one pot, usually to transplant it into another.

There have been patents obtained in the past on numerous varieties of paper and other sheet material folded and bent in particular ways to form different types of plant pots. Although conceivably these units could be unfolded to free the pot member from the soil inside, such would involve disengaging the interlocking structure of the unit and perhaps ruining the folding pot in the process by pressing the unit into a service for which it was not intended. Other attempts have been made to create a breakaway pot which separates or folds into several distinct pieces to permit the easy removal of the root and soil mass for transplanting. A pot of this type is disclosed in U.S. Pat. No. 4,059,921 issued to Takeshi Moriwaki in 1977.

Yet another thrust at solving the same problem is exemplified in U.S. Pat. No. 1,638,693 issued in 1927. The device of this patent is a rigid disk bottom piece having blades extended up the side flush with the interior of the pot. By rotating the entire structure, the blades cut through the root mass, or scrape the root mass from the sides of the pot, subsequent to which the devise and the root mass can be lifted free of the pot. Although this device appears to be an advance in the art, it would have to be manufactured exactly to the shape of the interior of the pot to be effective, and the blades are subject to the possibility of damaging the root structure. In addition, it is fairly likely that there would be a tendency to twist the unit in the event the plant was firmly rootbound.

Aside from theoretical developments, there is no currently prevalent simple means of removing potted plants from their containers. Because a plant might require transplanting several times between seedling and maturity, and each time it is transplanted it suffers unnecessary trauma, as well as the risk of death, it is advantageous to provide the ordinary plant part with a means of simply and cheaply transplanting the root mass while minimizing the danger of damage to the roots.

SUMMARY OF THE INVENTION

The present invention resolves the above-mentioned problems by providing an extremely inexpensive and absolutely effective means of removing plants from their pots in which they are captive. The invention is a sheet of flexible material which is utilized to line the pot container and has finger grips on opposite sides of the plant pot at the top of the liner so that the entire flexible sheet member can be lifted, carrying the root mass captive within it when the plant needs transplanting. The liner is fabricated in at least two segments which are separable except for bottom portions which are joined together to make the entire unit integral. Several variations of the exact style are presented, including the provision of the liner with apertures to permit the passage therethrough of moisture and perhaps roots, and in another embodiment, a number of short spaces cover the exterior surface of the liner to space the sheet from the interior of the pot to promote the circulation of water.

DETAILED DESCRIPTION OF THE PREFERRED EMBODIMENT

Figure 1:
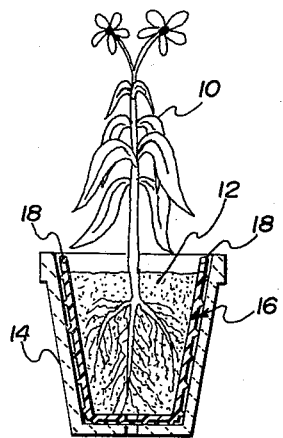
FIG. 1 is a vertical sectional view of the invention in place in a pot containing a plant.
Figure 4:
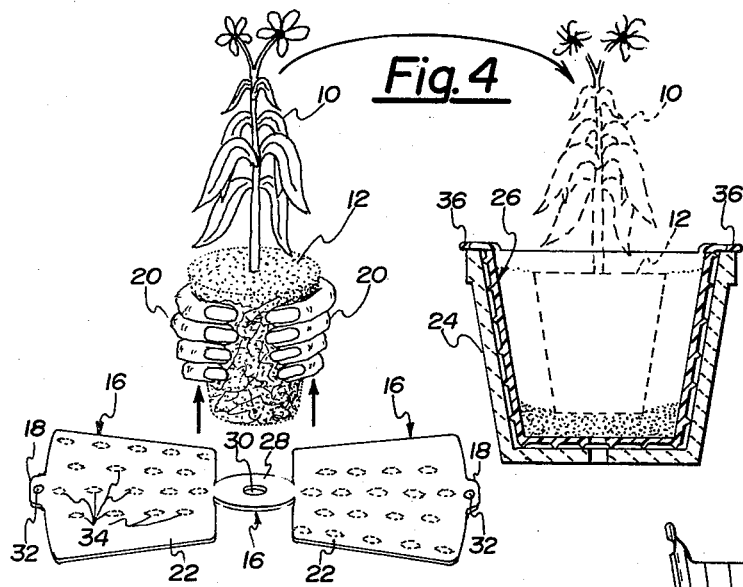
FIG. 4 is a perspective view illustrating the actual transplant of the plant into a larger pot shown in section with a larger liner therein.

The invention is shown in use in the sequence of figures beginning with FIG. 1 and ending in FIG. 4. A plant 10 having a root and soil mass 12 is planted in a conventional ceramic or plastic pot 14, and when the plant has achieved a size sufficient that based on its future growth, it is desired to transplant same.

Figure 2:
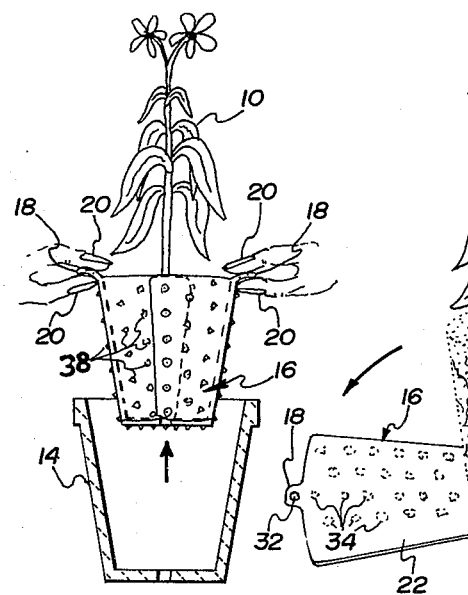
FIG. 2 is a front elevational view of the liner being removed from a pot shown in sections.

The owner of the plant, or the nursery from which it came, exercised foresight and good judgment in providing the plant with a transplanting liner 16 comprising a flexible sheet disposed between the pot and the root mass, covering substantially the entire interior surface of the pot. The liner 16 includes a pair of lobes or tabs 18 which are gripped by the fingers 20 as shown in FIG. 2 to remove the liner and the root mass from the old pot 14. Ordinarily, some restraining force would of course be applied to hold the pot down while the plant and root mass is removed.

Figure 3:
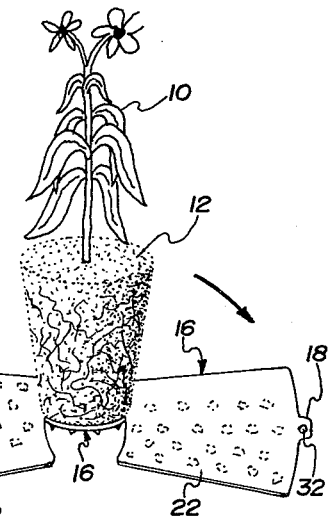
FIG. 3 is a prospective view of a root mass lying on the liner after it has been removed from the pot and separated from the root mass.

Once the plant is free of the pot, it is laid on a flat surface as shown in FIG. 3 and the two separable lobes 22 of the liner 16 are folded clear of the root mass and the root tendrils, subsequent to which the now-free root mass 12 is manually lifted and inserted into its new pot 24. Ordinarily, the owner, exercising the same foresight and judgment, initially required to install the first liner, would install a second liner 26 which is large enough to line the second pot 24. Naturally, additional soil and nutrients would be added to the pot 24 as shown in FIG. 4, beneath and surrounding the existing root mass.

The two lobes 22 of the preferred embodiment of the invention shown in FIGS. 1 through 24 are generally the shape of sectors of a circle truncated at the narrow end to provide generally flat edges which are tangentially related to and joined with a central, bottom disk 28 having a central drainage hole 30. The liner is stamped from a single sheet of flexible, preferably plastic stock such that the tabs of lobes 18 ideally have fingerholes 32.

The lobes 18 are shown as protuberances of the upper edge of the separable lobes 22, and ordinarily would project upwardly through the soil but be within the confines of the upper rim of the plant pot as shown in FIG. 1 so that they are virtually invisible to the observer. However, in some instances it may be desired to utilize longer lobes which lap over the edges of the pot as shown at 36 in FIG. 4, and clearly other configurations or finger grips are conceivable which would accommodate the same purpose.

Figure 5:
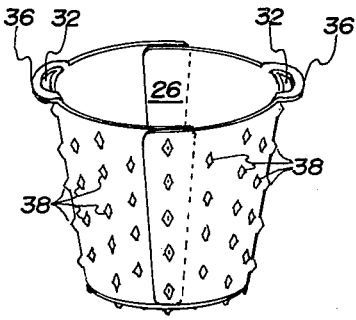
FIG. 5 is a perspective view of the liner removed from the pot.

FIG. 5 illustrates the liner removed from the plant root mass but retaining its basic configuration so that the projections 38 can be seen. These projections space the liner from the interior of the pot, serving the purpose of providing a water passageway. Water passageways can alternatively be provided by perforating the liner such as at the positions indicated in dotted line at 34 in FIGS. 3 and 4. These perforations provide circulation flue to the interior of the pot as an alternative which could be implemented to replace the projections 38.

Figure 6:
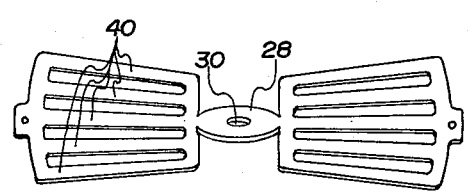
FIG. 6 is a perspective view of a modified embodiment of the invention.

FIG. 6 represents another embodiment similar in plan form to the first embodiment except that a plurality of strips 40 are defined in the sheet material, rather than the sheet being solid and perforated by diamonds of the like.

Figure 7:
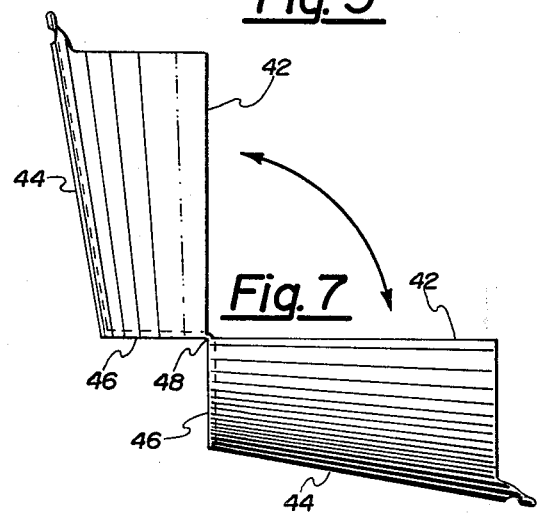
FIG. 7 is a partially vertically sectioned view of a second modification of the liner.

FIG. 7 illustrates a somewhat different version of the liner in which a pair of half shells 42 comprise circular, semi-truncated cone segments 44 actually attached by plastic welding or the like around the periphery of the bottom disk 46 so that both half shells are pivotal into position along a line 48 bisecting the bottom disk 46. When folded into its lining position, this embodiment covers the entire surface and actually defines a truncated cone having a bottom, similar to a plant pot itself.

Any of the embodiments disclosed herein facilitate the removal and transplantation of plants in a simple way designed to minimize damage to roots and retardation of growth due to the transplantation trauma. In addition, it is clear that the inexpensive nature of the item makes it ideal to meet current problems in a practical manner.

I claim:

1. A potted plant transplanting liner for expediting the removal of a plant together with its root mass from a plant pot, said liner comprising:
   (a) a unitary planar flexible sheet defining a generally circular central portion and a pair of oppositely-directed radially extended generally fan-shaped portions extending from opposite sides of said central portion;
   (b) a pair of tabs defined respectively by the outer edges of said radially extended portions;
   (c) whereby when said liner is nested in a plant pot it conforms substantially to the interior surface thereof and when said plant requires transplanting said sheet can be drawn fee of said pot by lifting same by said tabs, placing same on a horizontal surface, peeling said radially extended portions free of said root mass, and lifting said plant free of said generally circular central portion.

2. Structure according to claim 1 wherein said sheet liner is provided with a multiplicity of spaced projection extending from one side thereof to provide a circulation stratum between said liner and said pot.

3. Structure according to claim 1 wherein said sheet is provided with a plurality of spaced apertures to provide water circulation to said pot from inside said liner.

4. A method of planting and transplanting a potted plant comprising the following steps:
   (a) lining the interior of a circular plant pot with a flexible liner sheet having a generally circular central portion positioned against the bottom of said pot and two generally fan-shaped radially extended portions extending from said central portion and conforming to, and extending up, the sides of said pot, said radially extended portions each having a tab at the outer edge thereof;
   (b) inserting the roots of a plant and potting soil into the liner of said pot to a level below that of said tabs;
   (c) permitting said plant to grow to transplanting size;
   (d) transplanting said plant by drawing upwardly on said tabs to raise the root mass and potting soil contained in said liner free from said pot;
   (e) placing said liner with said root mass contained therein on a horizontal surface;
   (f) peeling back said radially extended portions to expose the sides of said root mass; and
   (g) lifting said root mass from said central portion for replanting.

* * * * *